US008085859B2

(12) United States Patent
Guo et al.

(10) Patent No.: US 8,085,859 B2
(45) Date of Patent: Dec. 27, 2011

(54) PLATFORM NOISE MITIGATION

(75) Inventors: Yongfang Guo, Sunnyvale, CA (US); Lei Shao, Sunnyvale, CA (US); Ernest T. Tsui, Cupertino, CA (US); Bernard Arambepola, Enfield (GB); Thushara Hewavithana, Borehamwood (GB); Xintian D. Lin, Mountainview, CA (US)

(73) Assignee: Intel Corporation, Santa Clara, CA (US)

( * ) Notice: Subject to any disclaimer, the term of this patent is extended or adjusted under 35 U.S.C. 154(b) by 727 days.

(21) Appl. No.: 11/904,813

(22) Filed: Sep. 28, 2007

(65) Prior Publication Data
US 2009/0086841 A1  Apr. 2, 2009

(51) Int. Cl.
*H04K 1/10* (2006.01)
*H04L 23/02* (2006.01)

(52) U.S. Cl. ........................................ 375/260; 375/262

(58) Field of Classification Search .................. 375/143, 375/144, 147, 148, 152, 260, 262, 265, 267, 375/343; 370/208, 210
See application file for complete search history.

(56) References Cited

U.S. PATENT DOCUMENTS

| 7,230,911 | B2 | 6/2007 | Jacobsen ........................ 370/208 |
| 7,251,282 | B2 | 7/2007 | Maltsev et al. ............... 375/260 |
| 2002/0097813 | A1* | 7/2002 | Vaidyanathan ............... 375/326 |
| 2004/0219885 | A1* | 11/2004 | Sugar et al. ................. 455/67.11 |
| 2005/0213692 | A1* | 9/2005 | Zhidkov ........................ 375/346 |
| 2006/0222092 | A1 | 10/2006 | Guo et al. ..................... 375/260 |
| 2006/0222096 | A1 | 10/2006 | Guo et al. ..................... 375/260 |
| 2006/0290434 | A1 | 12/2006 | Bettner et al. .................. 331/16 |
| 2007/0058693 | A1* | 3/2007 | Aytur et al. .................... 375/130 |

OTHER PUBLICATIONS

U.S. Appl. No. 11/476,365, filed Jun. 27, 2006, entitled "Mitigation of Interference From Periodic Noise," by Yongfang Guo, et al.

* cited by examiner

*Primary Examiner* — Young T. Tse
(74) *Attorney, Agent, or Firm* — Trop, Pruner & Hu, P.C.

(57) ABSTRACT

In one embodiment of the invention, a Fourier transform unit converts unsynchronized data received through multiple antennas to a frequency domain. Also, a spectrum estimation unit determines a power spectrum for the unsynchronized data. A notch filter removes data within a frequency band from additional unsynchronized data based on the power spectrum. A synchronization unit synchronizes the notch filtered data and a noise estimation unit determines a noise covariance matrix between the synchronized data received from multiple antennas. In addition, an equalization unit performs channel equalization on the synchronized data based on the noise covariance matrix.

6 Claims, 2 Drawing Sheets

PLATFORM NOISE MITIGATION

BACKGROUND

Wireless networking transceiver or receiver designs may experience a significant amount of interference that may be generated from both external sources and internal sources. External noise may be channel noise which includes relatively flat white noise. Internal noise originating from clocks and other internal devices, however, may include colored noise such as noise having distinct non-flat frequency components. For example, in a notebook computer internal sources such as clocks (e.g., display dot clock, data clock) and other components located on the wireless platform may generate signals that can cause significant interference within the wireless networking receiver. This internal platform noise can be troublesome because, for example, it may be periodic and change frequency with time. The noise may negatively affect radio receiver performance.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

Figure 1:
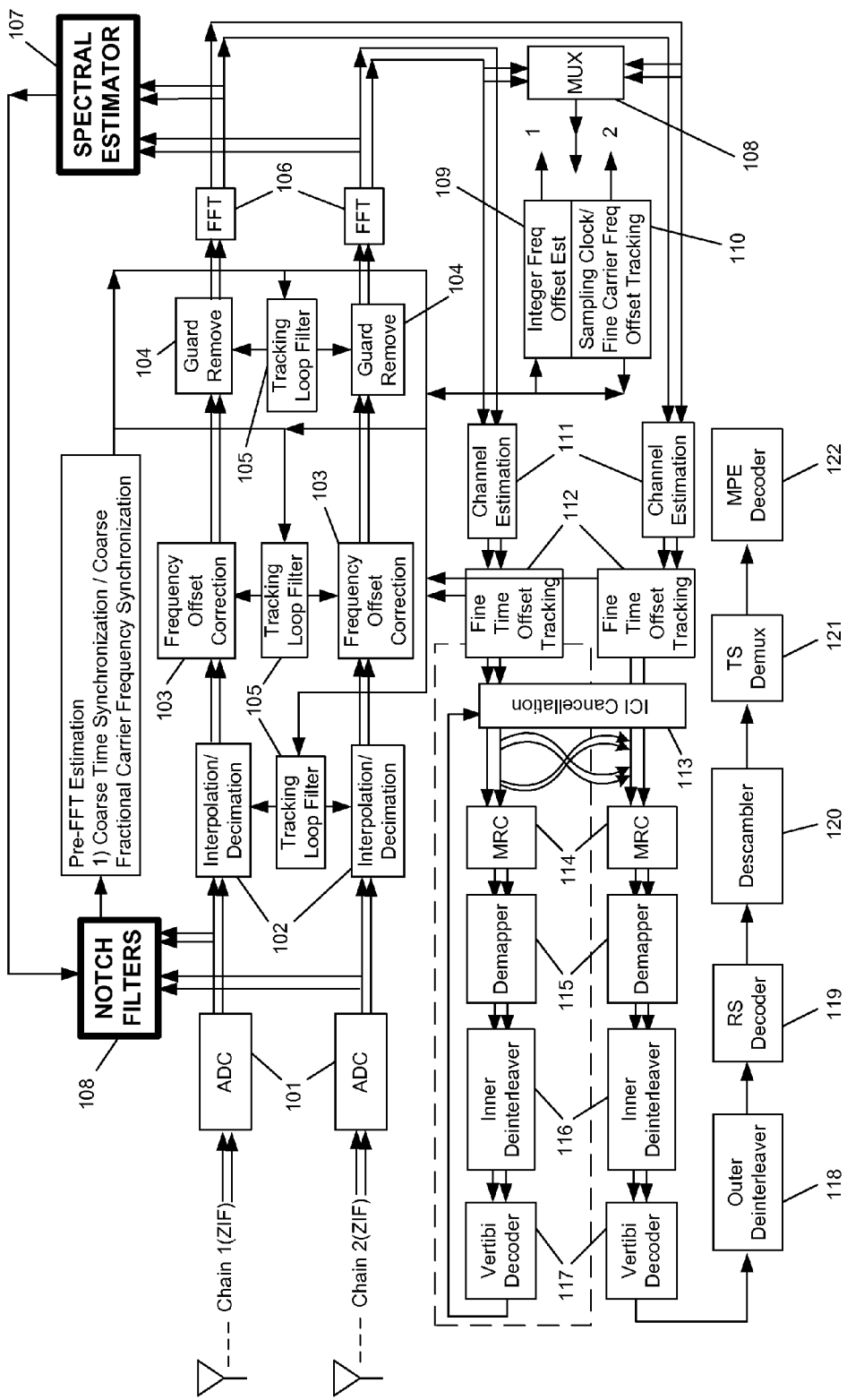
FIG. 1 is a block diagram of an embodiment of the invention.

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

As stated above, a receiver may experience noise from external sources and internal sources. Examples of such receivers include receivers using digital television standards such as Digital Video Broadcasting-Terrestrial (DVB-T), Digital Video Broadcasting-Handheld (DVB-H), or combinations thereof (e.g., DVB T/H).

Internal platform noise may be due to various clocks as well as the harmonics of the noise from those clocks. The clock harmonics may be a single tone interference or frequency-modulation (FW) interference with 0.5-3% spreading. The clock harmonics may fall in the receiver operation band, which can cause interference with operations of a receiver that is embedded into the device. This platform noise may be relatively stable over time despite its possible periodic nature. In addition, in systems such as diversity receivers that use two or more antennas, the noise spectrum may be strongly correlated between the antennas. As a specific example of this problematic noise, the platform noise power existing over an 8 MHz (494-502 MHz) wide channel on two receive antennas may be about 19 dB, which can be about 16 dB higher than the system noise floor. The spread clock may be about 2 MHz wide and the modulation frequency may be about 32 KHz.

Many receivers, such as those described above, operate with orthogonal frequency division multiplexing (OFDM), a multi-carrier transmission technique that uses orthogonal subcarriers to transmit information within an available spectrum. Before transmission, the subcarriers may be modulated with a low-rate data stream. The transmitted symbol rate of OFDM symbols may be low, and thus the transmitted OFDM signal may be highly tolerant to multipath delay spread within the channel. For this reason, this modulation scheme may be suitable for signals that need to survive in environments having multipath reflections and/or strong interference.

OFDM systems may be sensitive, however, to phase noise and frequency offset. Phase noise and frequency offset in OFDM systems may introduce interference, including intercarrier interference (ICI) and intersymbol interference (ISI). To demodulate the subcarriers, an OFDM receiver may perform a synchronization procedure to determine the location of symbol boundaries and timing instants. Inaccurate synchronization may result in a loss of orthogonality between the subcarriers resulting in ICI and/or ISI and reduction in system performance. OFDM systems may use a cyclic prefix and/or special OFDM training symbols to help achieve symbol timing and frequency synchronization.

Regarding the synchronization procedure, in one embodiment of the invention a DVB T/H receiver may include a synchronization stage for performing synchronization as described above. The synchronization stage may include several functions such as estimation and correction for, as an example, timing offset, sampling clock offset, and carrier frequency offset—all issues that may be present with modulated (e.g., OFDM) signals or data.

Regarding sampling clock offset more specifically, a receiver may sample incoming data received over the multiple antennas utilizing a sampling clock. If the frequency of the sampling clock includes a small offset, a phase-shift may occur between the received symbol received by the receiver and the original transmitted data transmitted by the transmitter. Therefore, a system such as an OFDM receiver may compensate the symbols of the data by estimating a sampling clock offset utilizing of pilot symbols to eliminate the effect caused by the sampling clock offset.

As for carrier frequency offset, this may be caused by the motion of a mobile receiver or the frequency instability of an oscillator in the receiver. The carrier frequency offset may harm the orthogonality among the subcarriers in OFDM systems and may give rise to ICI.

Also, timing offset may result in a rotation of the OFDM sub-carrier constellation. As a result, with compensation for these offsets an OFDM system may have difficulty in recovering the transmitted signal, especially when a high-order quadrature amplitude modulation (QAM) of the subcarriers is used. In other words, timing synchronization may include locating the beginning of a received OFDM symbol. The timing synchronization may help ensure a synchronized operation of the transmitter and the receiver. In the case of a digital television system, proper synchronization will facilitate display of qualitative images at the subscriber's screen on the basis of processing the useful parts of the symbols. In contrast, when failing to properly synchronize the transmitter and the receiver (i.e., the receiver fails to identify the beginning of the useful data part), the result may be that certain parts of a (redundant) data guard are processed (as it is erroneously identified by the receiver as belonging to the useful part of the symbol) and degraded quality of images are obtained and displayed.

FIG. 1 depicts a high level receiver architecture for a DVB T/H diversity receiver with multiple antennas. Here two receiver chains are considered in order to achieve diversity gain of DVB T/H signal reception (e.g., to achieve high receive quality). There are two lines coming from and to each block (e.g., block 101), which means the signal is a complex number (i.e., one line indicates a real part and the other line indicates an imaginary part).

After an analog to digital converter (ADC) 101, the receiver starts baseband processing. In one embodiment of the invention, the first stage of baseband processing is the synchronization stage where, for example and as stated above, sampling clock offset, carrier frequency offset, and timing offset estimation and correction are conducted. Specifically, in block 102 interpolation and/or decimation occurs for sampling clock offset correction. Then, in block 103 frequency offset correction takes place. Block 104 includes a guard removal unit (e.g., cyclic guard removal) for removing a guard-interval portion from a received symbol. In block 105, the phase noise contribution of a local oscillator (not shown) may be tracked and removed using a pilot tracking loop that includes a filter.

In DVB-T and DVB-H receivers, the peak of the time domain delayed auto-correlation uses the periodicity of a cyclic prefix to estimate the fractional frequency offset and the initial fast Fourier transform (FFT) trigger position. Again, OFDM systems may use a cyclic prefix and/or special OFDM training symbols to help achieve symbol timing and frequency synchronization. These "cyclic prefix" and "cyclic suffix" samples may make the transmitted signal more robust against time dispersion and timing offset.

In DVB-H receivers, quickly obtaining an accurate estimate of the above parameters can be important because a subsequent stage in the receiver or transceiver, the demodulation stage, may only be powered-up for short time intervals when the system operates in time-sliced mode. However, when colored platform noise (e.g., signal tone interference or spread clock) is present, the periodicity property of platform noise may cause error in frequency and time estimation. Therefore, noise estimation and mitigation algorithms may be useful to estimate a noise spectrum location and then to filter the harmful noise in time domain with a notch filter.

In one embodiment of the invention, data is sent to FFT block 106 after block 104. The FFT converts the time based samples to a frequency domain representation. The complex output samples of the FFT thus represent the received signal of the receiver (i.e., y=hx+n for each tone). In different embodiments of the invention, FFT may be implemented in a chip (in silicon) or may be performed by the host during a protocol idle period if such a period exists. Although illustrated as an FFT, it should be appreciated that any discrete Fourier transform functionality may be used.

After the FFT 106, a platform noise spectral estimation module 107 is used for interference tone detection. Notch filters 108 may then be used to notch out the estimated interference.

Regarding the spectral estimator 107 in a more detailed explanation of one embodiment of the invention, an average power spectrum may be obtained by doing FFT on un-synchronized time sequence over multiple OFDM symbol duration. Then, two moving sum analyses (MS) are applied on the average power spectrum and MS(short)/(MS(long)−MS (short)) is calculated over the whole spectrum. A moving sum function, like a moving average, may be used to smooth the effects of fluctuations. The MS(short)/(MS(long)−MS (short)) is similar to INR, where "I" is power due to a strong platform noise spike (i.e., MS(short)) and "N" is power due to average broadband noise (excluding the strong spike power) in the moving window of length len_moving_sum1 (i.e. MS(long)−MS(short)). The lengths of the moving sums may be chosen so that the ratio is large at a strong platform noise spike position and is small at a low noise positions, regardless of channel fading condition.

Afterwards, two thresholds (threshold_peak and threshold_surround) may be used to detect peaks and find notch filter parameters. threshold_peak may be used to extract the true peaks and threshold_surround may be used to find the notch pass bandwidth and notch frequency of the notch filters for the detected peaks. The notch filters 108 may then be tuned with notches at these frequencies to filter the time domain signal. For example, the notch filter can be a second order filter. By changing the coefficients of the filter, the notch frequency and bandwidth can be tuned to particular values. In one embodiment of the invention, a coefficient lookup table can be stored in the register. Then, based on the estimated notch frequency and bandwidth, the filter coefficient can be read out from the lookup table. The filtered time domain signal may then be used for pre-FFT fine frequency offset and FFT window trigger point estimation.

Thus, in one embodiment of the invention, a synchronization process may include performing a FFT on multiple OFDM symbol time to get an average spectrum. Then, a moving sum function (e.g., MA(short)/(MA(long)−MA (short)) may be calculated over the spectrum. Two or more thresholds (e.g., threshold_peak and threshold_surround) may next be used to detect peaks and find notch filter frequencies and bandwidths. The notch filters may then be designed with notches at these frequencies. Finally, a filtered time domain signal may be used to perform pre-FFT fine frequency offset and FFT window trigger point estimation Since pre-FFT synchronization is done once at the beginning of the transmission/time slice, notch filters 108 and spectrum estimation block 107 may be turned off along with the pre-FFT synchronization block, which may include blocks 102, 103, 104, 105, after signal acquisition. In one embodiment of the invention using DVB-H mode, the spectral estimator 107 need not be switched on at the start of every time slice since the spectral properties of the platform interference sources may not change rapidly.

After synchronization is complete, demodulation may occur according to methods known to those of ordinary skill in the art. In the multiplexer block 108, after integer frequency offset estimation is done, it then switches to sampling clock/fine frequency offset tracking function. In block 109 integer frequency offset estimation may occur. In block 110, sampling clock/fine carrier frequency offset tracking may occur. Channel estimation may occur in block 111 with fine time offset tracking occurring in block 112. ICI cancellation occurs in block 113 with maximum-ratio-combining (MRC) in block 114 and demapping in block 115. MRC is a method of diversity combining in which the signals from each channel are added together, the gain of each channel is made proportional to the rms signal level and inversely proportional to the mean square noise level in that channel, and different proportionality constants are used for each channel. Demapper in block 115 transfers the QAM modulated signal to soft-bits (e.g., a QPSK signal is mapped to 2 bits and a 16QAM signal is mapped to 3 bits). Inner deinterleaver occurs in block 116 with Vertibi decoding in block 117. Outer deinterleaver occurs in block 118 with Reed Solomon error correction in block 119. Finally, descrambling occurs in block 120, transport stream demultiplexing occurs in block 121, and Multiple-Protocol Encapsulation (MPE) decoding occurs in block 122.

As mentioned above, the receiver may also include a demodulation stage. After synchronization occurs and the residual sampling clock offset and carrier frequency offset are relatively small, the demodulation stage may begin and the following functions may occur: channel estimation, channel equalization, data detection, and data decoding.

However, platform noise may also degrade demodulation performance significantly. Therefore, in one embodiment of the invention, a pilot-based estimate of the covariance matrix of platform noise may be calculated. Then, the high correlation of platform noise seen at the two (or more) receive antennas may be used minimize the demodulation performance degradation. This may be accomplished using, for example, minimum mean square error (or MMSE) based equalization. MMSE describes the statistical estimator with the least possible mean squared error. This may result in improved final bit error ratio (BER) performance. Examples of bit error ratio are (a) transmission BER, i.e., the number of erroneous bits received divided by the total number of bits transmitted; and (b) information BER, i.e., the number of erroneous decoded (corrected) bits divided by the total number of decoded (corrected) bits.

Figure 2:
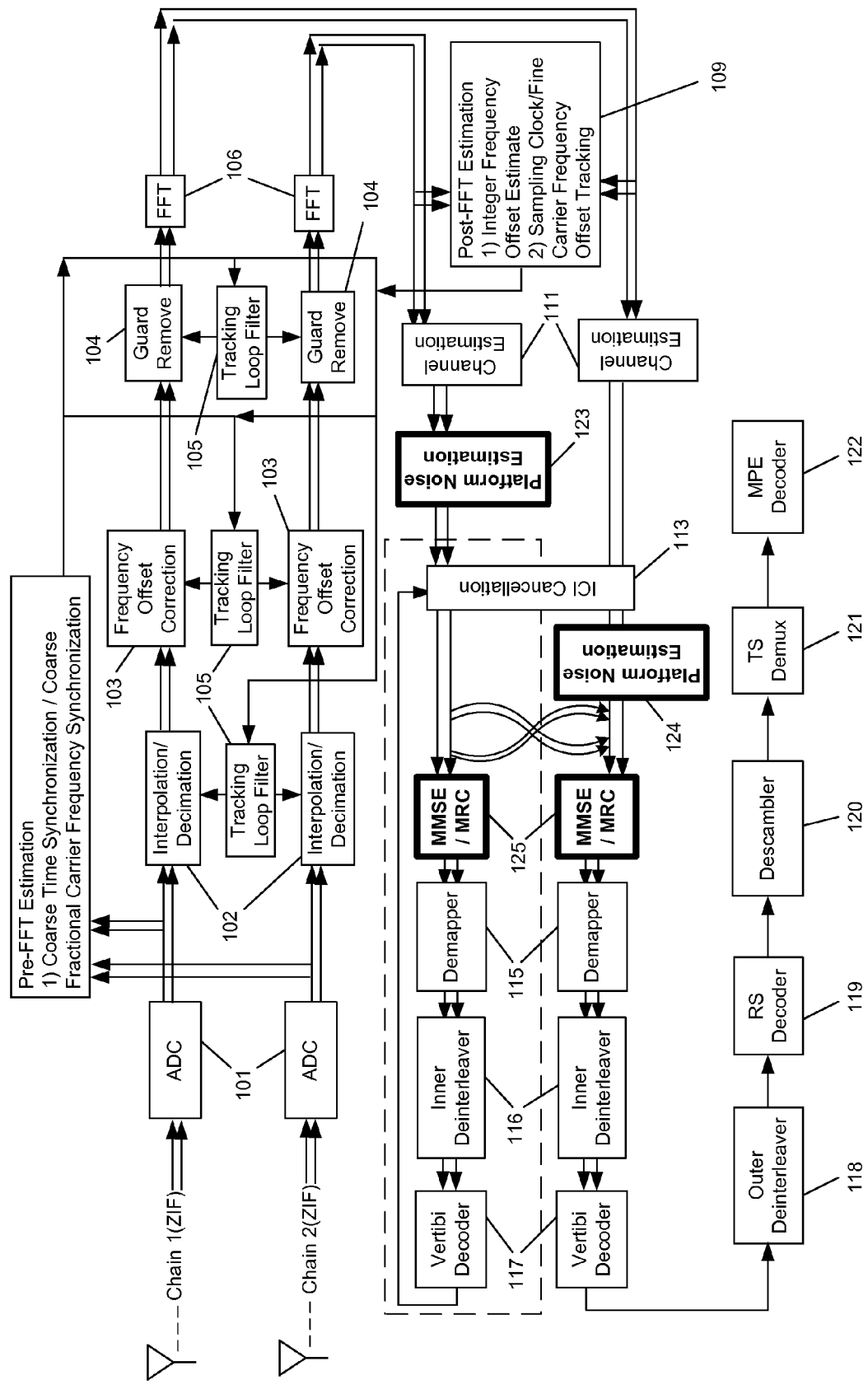
FIG. 2 is a block diagram of one embodiment of the invention.

In one embodiment of the invention shown in FIG. 2, the architecture of a standard DVB T/H receiver architecture is modified to add platform noise estimation blocks 123, 124 and to replace MRC by MMSE (block 125) combining for channel equalization. A pilot based platform noise estimation algorithm may be used to estimate the platform noise covariance matrix.

Assume the symbol at i'th pilot of k'th OFDM symbol to be, $y_k(i)=H_k(i)p_i+n_k(i)$. Where $p_i$ is a pilot, $H_k(i)$ is the channel information, and the noise $n_k(i)$ includes the thermal noise, platform noise, ICI and other interference, which is the total noise seen in the system. The noisy channel estimate is given by, $$\hat{H}_k(i) = \frac{y_k(i)}{p_i} = H_k(i) + \frac{n_k(i)}{p_i}.$$

This noisy estimate may be filtered to obtain a clean channel estimate. In 8K mode for a TU6 channel model, frequency filtering alone may remove much of the noise. In 2K mode, however, a time filter may need to be followed by a frequency interpolator/filter to sufficiently filter out the noise. After filtering to yield a clean channel response $\overline{H}_k$, the noise estimate is calculated as, $\hat{n}_k(i)=y_k(i)-p_i\overline{H}_k(i)$.

Next, the noise estimates $\hat{n}_k^1(i)$ and $\hat{n}_k^2(i)$ for two channels, may be used to calculate the noise covariance matrix: $R_k(i)=[\hat{n}_k^1(i)\hat{n}_k^2(i)]^H[\hat{n}_k^1(i)\hat{n}_k^2(i)]$ on a symbol by symbol basis. Using an autoregressive (AR) averaging would be one approach to achieve $R_k(i)=(1-\alpha)R_{k-1}(i)+\alpha n_k(i)n_k(i)^H$ where $\alpha$ is an AR coefficient in the range (0,1). A linear interpolation may be used to obtain the platform noise covariance matrix estimate over data tones.

Thus, the platform noise covariance matrix estimation algorithm conducts the channel estimation over pilots and filters the noisy channel estimation. Then, the algorithm estimates the instantaneous noise by subtracting the product of the filtered channel estimate and pilot from the received pilot. Then, AR averaging is used to get the covariance matrix over pilots. A linear interpolation may then be used to get the covariance matrix over data tones.

This algorithm may not only address platform noise, but other system noise may be estimated. The instantaneous platform noise estimation algorithm may able track the variation of noise covariance matrix by choosing an AR coefficient to be different number. If the noise in the system is stable, a small $\alpha$ should be chosen (e.g., $\alpha=1/32$).

After the platform noise covariance matrix information is determined, a MMSE equalization may take advantage of noise correlation between two receive antennas to minimize the impact of platform noise. Given the noise covariance matrix R and the estimated channel $$\hat{H} = \begin{bmatrix} h_1 \\ h_2 \end{bmatrix}$$

over one data subcarrier using linear channel estimation, the estimated transmit signal $\hat{x}$ can be obtained by MMSE equalizer as $\hat{x}=\hat{H}^H(\hat{H}\hat{H}^H+R)^{-1}Y$ where $$Y = \begin{bmatrix} y_1 \\ y_2 \end{bmatrix}$$

is received signal over one data subcarrier at two receive antennas.

The noise covariance matrix R may be different in upper and lower chains. When there is ICI in the system due to, for example, high Doppler frequency, the $n_k(i)$ in the upper chain may contain additional ICI noise while the $n_k(i)$ in the lower chain may have no ICI noise after ICI cancellation through the upper chain.

Therefore, in order to improve ICI cancellation performance in the presence of platform noise in the upper chain, the total noise covariance matrix may be estimated in the upper chain, where R1 includes system noise (e.g. thermal noise, platform noise, ICI noise, channel estimation error, and other interference) and then using MMSE to obtain more accurate estimation data in the presence of both platform noise and ICI noise.

After ICI cancellation (block 113), the lower chain may be addressed. The total noise covariance matrix R2, where R2 includes residual system noise after ICI cancellation (e.g., thermal noise, platform noise, residual ICI noise, channel estimation error and other interference) and then using MMSE to obtain a more accurate estimation data in the presence of platform noise only. If there is no ICI in the system, the upper chain may be bypassed. The Viterbi decoder in block 117 subsequently uses the soft bits to determine the data stream that the received signal y most likely represents.

Finally, platform noise may also adversely affect the pilot based frequency offset/sampling clock estimation which uses pilot tone correlation between two successive OFDM symbols after FFT (block 106). In order to mitigate the impact of platform noise, the bad pilot with strong platform noise power (based on the noise power estimation block 123, 124) may be punctured for the correlation calculation to improve frequency offset/sampling clock estimation in the presence of platform noise.

Thus, in one embodiment of the invention a "blind" interference spectrum location estimation and notch filter algorithm receive signals in the time domain. This may improve the performance of coarse frequency offset estimation and initial FFT window estimation. Tone puncture may improve the frequency/sampling clock residual offset tracking performance. Also, a pilot-based platform noise estimation algorithm may estimate the platform noise covariance matrix. Also, a MMSE equalization, which contains platform noise covariance matrix information, may improve the final BER performance.

Under an embodiment of the invention, a computer comprises a bus or other communication means for communicating information, and a processing means such as two or more processors coupled with the bus for processing information. The processors may comprise one or more physical processors and one or more logical processors. Further, each of the processors may include multiple processor cores. The computer may have multiple different buses and the component connections to such buses may vary (e.g., bridges, adapters, or controllers). The bus may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394 1995, IEEE, published Aug. 30, 1996, and supplements) In an embodiment of the invention, the processor or processors may be used to process and mitigate received dynamic platform noise.

In one embodiment of the invention, the computer may further comprise a random access memory (RAM) or other dynamic storage device as a main memory for storing information and instructions to be executed by the processors. Main memory also may be used for storing temporary variables or other intermediate information during execution of instructions by the processors. RAM memory may include dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data out dynamic random access memory (EDO DRAM). The uses of the main memory may include the storage of data related to the mitigation of dynamic platform noise. The computer also may comprise a read only memory (ROM) and/or other static storage device for storing static information and instructions for the processors. A data storage device may also be coupled to the bus of the computer for storing information and instructions. The data storage device may include a magnetic disk or optical disc and its corresponding drive, flash memory or other nonvolatile memory, or other memory device. Such elements may be combined together or may be separate components, and utilize parts of other elements of the computer. The computer may also be coupled via the bus to a display device, such as a cathode ray tube (CRT) display, a liquid crystal display (LCD), a plasma display, or any other display technology, for displaying information to an end user. In some environments, the display device may be a touch screen that is also utilized as at least a part of an input device. In some environments, display device may be or may include an audio device, such as a speaker for providing audio information. An input device may be coupled to the bus for communicating information and/or command selections to the processors. In various implementations, input device may be a keyboard, a keypad, a touch screen and stylus, a voice activated system, or other input device, or combinations of such devices. Another type of user input device that may be included is a cursor control device, such as a mouse, a trackball, or cursor direction keys for communicating direction information and command selections to the one or more processors and for controlling cursor movement on the display device. A communication device may also be coupled to the bus. Depending upon the particular implementation, the communication device may include a transceiver, a wireless modem, a network interface card, LAN (Local Area Network) on motherboard, or other interface device. The uses of a communication device may include reception of signals from wireless devices. For radio communications, the communication device may include one or more antennas. In an embodiment of the invention, the communication device includes a WLAN receiver, the receiver includes processing for the mitigation of dynamic platform noise. In one embodiment, the communication device may include a firewall to protect the computer from improper access. The computer may be linked to a network or to other devices using the communication device, which may include links to the Internet, a local area network, or another environment. The computer may also comprise a power device or system, which may comprise a power supply, a battery, a solar cell, a fuel cell, or other system or device for providing or generating power. The power provided by the power device or system may be distributed as required to elements of the computer. In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. The present invention may include various processes. The processes of the present invention may be performed by hardware components or may be embodied in machine executable instructions, which may be used to cause a general purpose or special purpose processor or logic circuits programmed with the instructions to perform the processes. Alternatively, the processes may be performed by a combination of hardware and software. Portions of the present invention may be provided as a computer program product, which may include a machine readable medium having stored thereon instructions, which may be used to program a computer (or other electronic devices) to perform a process according to the present invention. The machine readable medium may include, but is not limited to, floppy diskettes, optical disks, CD ROMs (compact disk read only memory), and magneto optical disks, ROMs (read only memory), RAMs (random access memory), EPROMs (erasable programmable read only memory), EEPROMs (electrically erasable programmable read only memory), magnet or optical cards, flash memory, or other type of media/machine readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below. It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, while the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a synchronization stage configured to receive data from a plurality of antennas to provide time domain of the received data as synchronized data;
   a Fourier transformation stage configured to convert the time domain into frequency domain of the received data;
   a spectrum estimation unit configured to detect the frequency domain of the received data to determine a power spectrum for the received data; and
   a notch filter coupled to the spectrum estimation unit configured to remove data within a frequency band from the received data based on the power spectrum, wherein removing the data from the received data produces filtered data to the synchronization stage.

2. The apparatus of claim 1, wherein the synchronized data includes pilot tones.

3. The apparatus of claim 1, wherein the received data includes noise that varies in frequency over time.

4. A method comprising:
   synchronizing, by a synchronizing stage, received data from a plurality of antennas to provide time domain of the received data as synchronized data;
   converting, by a Fourier transformation stage, the time domain into frequency domain of the received data;
   detecting, by a spectrum estimation unit, the frequency domain of the received data to determine a power spectrum for the received data; and
   filtering and removing data within a frequency band from the received data based on the power spectrum, wherein removing the data from the received data produces filtered data to the synchronization stage.

5. The method of claim 4, wherein the synchronized data includes pilot tones.

6. The method of claim 4, wherein the received data includes noise that varies in frequency over time.

* * * * *